United States Patent Office 3,634,481
Patented Jan. 11, 1972

3,634,481
METHOD OF MAKING TETRAETHYLLEAD
Kenneth C. Williams, Baton Rouge, La., assignor to
Ethyl Corporation, New York, N.Y.
No Drawing. Filed Sept. 2, 1969, Ser. No. 854,740
Int. Cl. C07f 7/24
U.S. Cl. 260—437 R 4 Claims

ABSTRACT OF THE DISCLOSURE

A method of making tetraethyllead wherein triethylaluminum is reacted with lead acetate in the presence of hexamethylphosphoramide as a catalyst or solvent.

BACKGROUND OF THE INVENTION

The present invention is in the field of organolead synthesis and particularly the synthesis of tetraalkylleads. The invention is especially concerned with the reaction of triethylaluminum and lead salts of organic acids.

It has been previously discovered that triethylaluminum may be reacted with lead acetate in toluene to produce tetraethyllead in near quantitative yields. This reaction may be summarized as follows:

$$4Et_3Al + 6Pb(OAc)_2 \rightarrow 3Et_4Pb + 3Pb + 4Al(OAc)_3$$

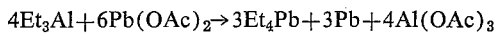

Although aromatic hydrocarbon solvents such as toluene were found to give the best yields of tetraethyllead, reaction times from one-half hour to one hour or even longer are required. There is also some difficulty in separating the products. Tetraethyllead (TEL) and toluene have similar solubility properties and fractional distillation is therefore necessary in order to separate them. Since TEL is unstable at high temperatures, distillation is undesirable.

SUMMARY OF THE INVENTION

It has been discovered that the reaction of triethylaluminum with a salt of an organic acid, preferably lead acetate, can be shortened considerably by the use of hexamethylphosphoramide as a catalyst and/or solvent. Yields of up to 98 percent have been obtained with a reaction time of only 15 minutes and at ambient temperature.

It is therefore a primary object of the present invention to provide a new and improved catalyst system for the reaction of triethylaluminum and a lead salt of an organic acid wherein high yields of tetraethyllead may be produced in substantially shorter periods of time.

Another important object of the present invention is to provide a simple method of preparing tetraorganoleads at ambient temperatures.

Still another object of the present invention is to provide a method of making tetraorganoleads from the reaction of triethylaluminum and lead salts of organic acids wherein the separation of the products is facilitated.

A further object is to provide an improved catalyst and/or solvent, hexamethylphosphoramide, for making tetraorganoleads from the reaction of triethylaluminum and lead acetate or other suitable lead salt of an organic acid.

The products of this invention possess considerable utility. Such compositions are soluble in hydrocarbons and are valuable as antiknock compounds in gasolines. Tetraethyllead is an exemplary antiknock compound.

Other objects and advantages of the present invention will become more readily apparent from a consideration of the description hereinafter.

DESCRIPTION OF THE PREFERRED EMBODIMENT

In the preferred form of the invention, tetraethyllead is prepared from the reaction of triethylaluminum with lead acetate in the presence of a hexamethylphosphoramide solvent system.

The process of this invention may be more completely understood and illustrated by the following examples.

Example I

All reactions were carried out under a nitrogen atmosphere. Hexamethylphosphoramide (HMPT) was distilled from calcium hydride before use. The reactions were performed in a 500-ml three-necked round-bottom flask equipped with a condenser and stirrer. The lead salt was added from a 50-ml. flask connected to the reaction vessel by a short piece of Gooch tubing.

Tetraethyllead was prepared by adding 32.5 g. (0.1 m.) of lead acetate to a solution of 10.2 ml. (0.067 m.) of triethylaluminum (TEA) in 75-ml. of hexamethylphosphoramide (HMPT) over a 5-minute period. The solution was heated to 70° C. and cooled immediately to ambient temperature for a total reaction time of 15 minutes. Lead metal was obtained as a lump and a silky white precipitate was obtained. Pentane (200-ml.) was added and the precipitate which formed was filtered. The filtrate was hydrolyzed with 300-ml. of water and the organic phase was separated. Analysis of the organic phase yielded 15.4 g. (95.5 percent) of tetraethyllead. An NMR spectrum of the white precipitate in deuterated methanol was consistent with a 1:1 complex of aluminum acetate and HMPT.

In similar experiments, potassium chloride and ethyl chloride were added, but no effect on yields or production of lead metal was observed.

The complex $[Al(C_2H_3O_2)_3 \cdot HMPT]$ can be readily recovered by filtering. When the filtrate is hydrolyzed with water the tetraethyllead collects in the hydrocarbon organic layer (HMPT is completely miscible with water).

Example II

Water (200-ml.) was added to a HMPT solution containing 15 g. of TEL. The heavy TEL layer which separated was recovered and weighed. A quantitative recovery was made (15 g.). The HMPT-water solution was distilled to recover the TMPT for use in a subsequent reaction.

In effectively carrying out the reaction of triethylaluminum and lead acetate, the catalyst or solvent, hexamethylphosphoramide should be present in an amount of from about 2 to about 10 moles of hexamethylphosphoramide per mole of triethylaluminum. The addition of water to the reaction mixture enables tetraethyllead to be recovered as a separate heavy phase.

The foregoing disclosure and description of the invention is illustrative and explanatory thereof and various changes may be made within the scope of the appended claims without departing from the spirit of the invention.

What is claimed is:
1. A process of preparing tetraethyllead comprising reacting triethylaluminum and lead acetate in the presence of a hexamethylphosphoramide catalyst or solvent.
2. A process according to claim 1, wherein the catalyst is present in an amount of about two to ten moles per mole of triethylaluminum.
3. A process according to claim 1, wherein lead acetate is used in an amount in excess of that required to react with the triethylaluminum.
4. A process according to claim 1, wherein tetraethyllead is recovered as a separate heavy phase by the addition of water to the reaction mixture.

References Cited

UNITED STATES PATENTS 2,859,231   11/1958   Blitzer _____ 260—437

OTHER REFERENCES

Normant, Angew. Chem. Internat. Edit. vol. 6, pp. 1046, 1048, 1049 (1967).
Chemical Abstracts, vol. 54, p. 9738a (1960).
Chemical Abstracts, vol. 55, p. 15335g (1961).

TOBIAS E. LEVOW, Primary Examiner

H. M. S. SNEED, Assistant Examiner